United States Patent [19]

Yamaya et al.

[11] Patent Number: 4,959,443

[45] Date of Patent: Sep. 25, 1990

[54] THERMOSETTING RESIN COMPOSITION FROM BIS MALEIMIDE AND AROMATIC AMINE RESIN

[75] Inventors: Norimasa Yamaya; Masahiro Ohta; Akihiro Yamaguchi, all of Kanagawa, Japan

[73] Assignee: Mitsui Toatsu Chemicals, Inc., Tokyo, Japan

[21] Appl. No.: 351,471

[22] Filed: May 15, 1989

[30] Foreign Application Priority Data

May 17, 1988 [JP] Japan .................. 63-118363

[51] Int. Cl.$^5$ ............................................. C08L 33/24
[52] U.S. Cl. ................................ 528/170; 525/534; 525/540; 528/322
[58] Field of Search ............... 528/170, 322; 525/540, 525/534

[56] References Cited

U.S. PATENT DOCUMENTS 4,160,859  7/1979  Renner et al. ................... 528/170

FOREIGN PATENT DOCUMENTS 0253586  1/1988  European Pat. Off. .
3193924  8/1988  Japan ............................ 528/170

Primary Examiner—Harold D. Anderson
Attorney, Agent, or Firm—Burns, Doane, Swecker & Mathis

[57] ABSTRACT

The present invention relates to thermosetting resin compositions comprising a bismaleimide compound represented by the formula (I)

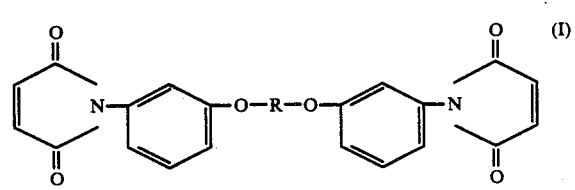

and an aromatic amine resin represented by the general formula (II)

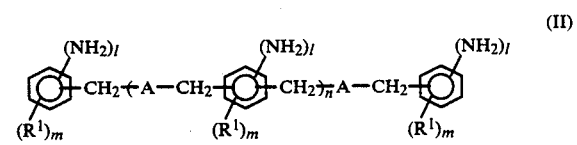

and to processes for preparing the same.

21 Claims, No Drawings

THERMOSETTING RESIN COMPOSITION FROM BIS MALEIMIDE AND AROMATIC AMINE RESIN

BACKGROUND OF THE INVENTION (a) Field of the Invention

The present invention relates to novel thermosetting resin compositions useful for preparing molded articles that are heat resistant and exhibit high mechanical strength.

(b) Description of the Prior Art

Prior to the present invention, thermosetting resins having an imide structure have been extensively utilized in various industrial fields, since cured materials obtained from these resins exhibit excellent electrical insulating properties, heat resistance and dimensional stability.

However, thermosetting resins obtained by thermal polymerization of aromatic bismaleimides alone are extremely brittle and have poor flexibility although they are excellent in heat resistance. In an attempt to overcome these disadvantages, thermosetting resin compositions have been developed that contain an aromatic bismaleimide and an aromatic diamine. For example, a polyaminobismaleimide resin (Rhone-Poulenc; trade name Kelimid) comprising N,N'-4,4'-diphenylmethanebismaleimide and 4,4'-diaminodiphenylmethane is widely used in the fields of impregnating varnishes, laminated plates, molded articles and the like (Japanese Patent Laid-open Publication No. 23250/1971).

However, thermosetting resin compositions containing an aromatic bismaleimide and an aromatic diamine exhibit poor heat resistance, and unsatisfactory impact resistance and flexibility.

SUMMARY OF THE INVENTION

The present invention overcomes the problems and disadvantages of the prior art by providing thermosetting resin compositions useful for preparing molded articles that exhibit superior mechanical strength and heat resistance than prior art resins.

It is an object of the present invention is to provide thermosetting resin compositions that are useful for preparing molded articles having high mechanical strength and heat resistance.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodiment and broadly described herein, the invention provides a thermosetting resin composition comprising (a) about 100 parts by weight of a bismaleimide compound of the formula (I)

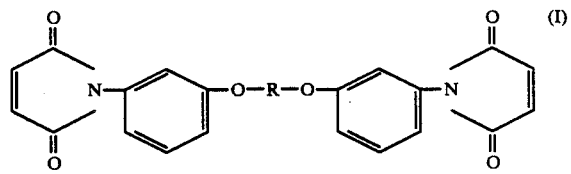

wherein R represents a divalent group selected from the group consisting of

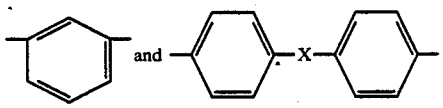

wherein X is directly bonded to the benzene rings and represents a group selected from the group consisting of a divalent hydrocarbon group having from 1 to 10 carbon atoms, an isopropylidene group having six fluorine atoms, a carbonyl group, a thio group, a sulfinyl group, a sulfonyl group and an oxo group, and (b) from about 5 to about 100 parts by weight of an aromatic amine resin of the formula (II)

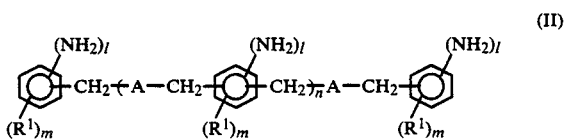

wherein A is selected from the group consisting of a phenylene group, an alkyl-substituted phenylene group, a diphenylene group, a diphenyl ether group and a naphthylenyl group; $R^1$ is selected from the group consisting of a halogen atom, a hydroxyl group, an alkoxy group having no greater than about 4 carbon atoms, and an alkyl group having no greater than about 5 carbon atoms; $l$ is 1 or 2; m is an integer of from 0 to 3, and when m is 2 or 3, the groups represented by $R^1$ may be identical or different, and two of these groups may form a five-membered ring or six-membered aliphatic ring which may have a side chain; and n is an integer of from 0 to 300.

DESCRIPTION OF THE PREFERRED EMBODIMENTS

Reference will now be made in detail to the present preferred embodiments of the invention.

A bismaleimide compound represented by the formula (I) can be prepared by subjecting to a conventional condensation/dehydration reaction and a maleic anhydride and a diamine compound represented by the formula (III)

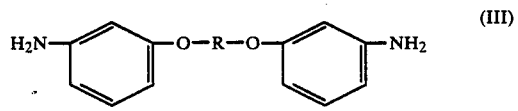

wherein R represents a divalent group selected from the group consisting of

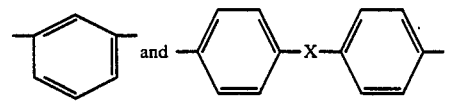

wherein X is directly bonded to the benzene rings and is a group selected from the group consisting of a divalent hydrocarbon group having from 1 to 10 carbon atoms, an isopropylidene group having six fluorine atoms, a carbonyl group, a thio group, a sulfinyl group, a sulfonyl group and an oxo group.

Exemplary divalent groups of the moiety R in the bismaleimide compound (I) include

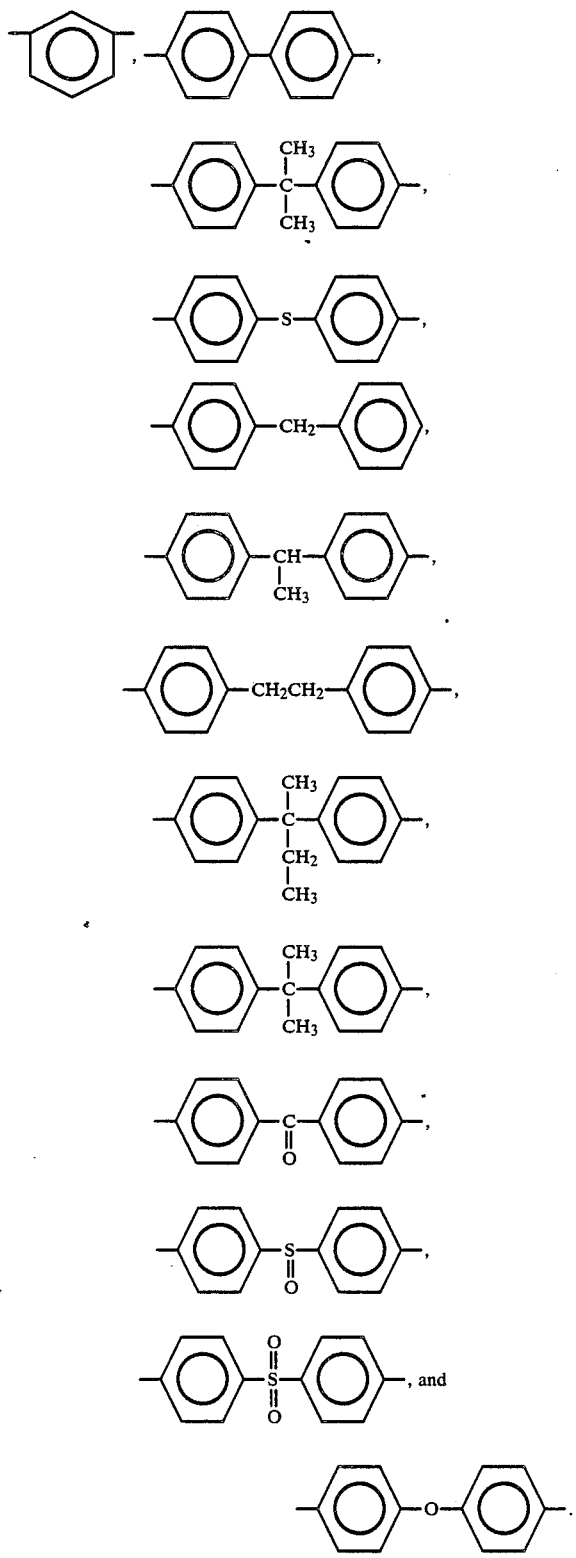

Preferably, the moiety R is selected from the group consisting of

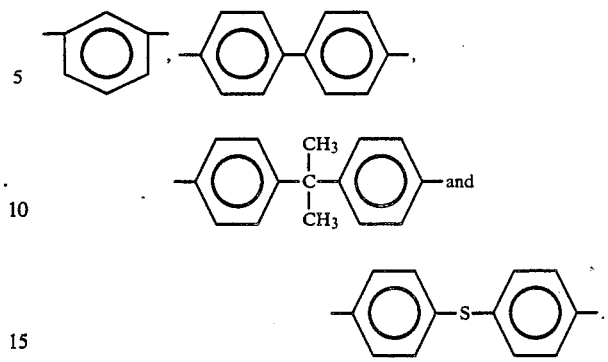

Exemplary suitable bismaleimide compounds of the formula (I) for use in the present invention include 1,3-bis(3-maleimidophenoxy)benzene, bis[4-(3-maleimidophenoxy)phenyl]methane, 1,1-bis[4-(3-maleimidophenoxy)phenyl]ethane, 1,2-bis[4-(3-maleimidophenoxy)phenyl]ethane, 2,2-bis[4-(3-maleimidophenoxy)phenyl]propane, 2,2-bis[4-(3-maleimidophenoxy)phenyl]butane, 2,2-bis[4-(3-maleimidophenoxy)phenyl]-1,1,1,3,3,3-hexafluoropropane, 4,4-bis(3-maleimidophenoxy)biphenyl, bis[4-(3-maleimidophenoxy)phenyl]ketone, bis[4-(3-maleimidophenoxy)phenyl] sulfide, bis[4-(3-maleimidophenoxy)phenyl] sulfoxide, bis[4-(3-maleimidophenoxy)phenyl]sulfone and bis[4-(3-maleimidophenoxy)phenyl] ether. The bismaleimide compounds can be used singly or in combination.

The aromatic amine resin of the formula (II) used in the present invention can be prepared by reacting (a) 1 mole of an aralkyl alcohol derivative represented by the formula (IV)

$$R^2OCH_2-A-CH_2OR^2 \qquad (IV)$$

wherein A is selected from the group consisting of a phenylene group, an alkyl-substituted phenylene group, a diphenylene group, a diphenyl ether group and a naphthylenyl group, and $R^2$ is selected from the group consisting of a hydrogen atom, an acyl group and an alkyl group having no greater than 4 carbon atoms, with (b) from about 1 to about 15 moles of an aromatic amine compound represented by the formula (V)

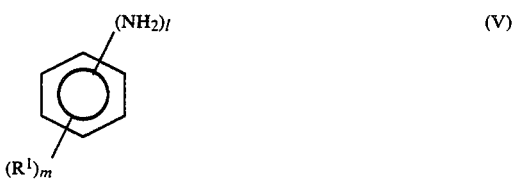

wherein $R^1$ is selected from the group consisting of a halogen atom, a hydroxyl group, an alkoxy group having no greater than 4 carbon atoms, and an alkyl group having no greater 5 carbon atoms; l is 1 or 2; m is an integer of from 0 to 3, and when m is 2 or 3, the groups represented by $R^1$ may be identical or different, and two of these groups may form a five-membered ring or six-membered aliphatic ring which may have a side chain (Japanese Patent Application No. 252517/1987).

The moiety A in the aralkyl alcohol derivative represented by the formula (IV) is preferably a phenylene group selected from the group consisting of

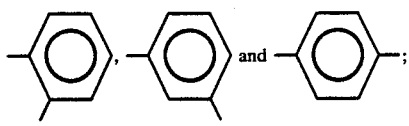

an alkyl-substituted phenylene group selected from the group consisting of

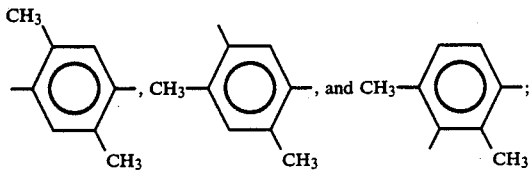

a diphenylene group of

a diphenyl ether group of

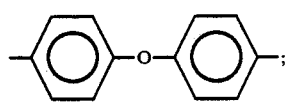

and a naphthylene group of

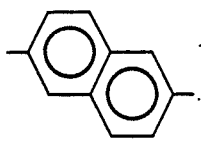

Preferably, the moiety A is selected from the group consisting of

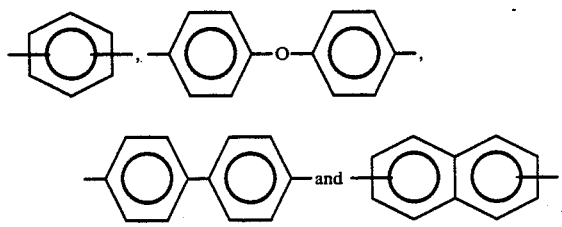

Most preferably, the moiety A is

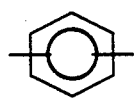

$R^2$ in the formula (IV) is selected from the group consisting of a hydrogen atom, an acyl group or an alkyl group. Exemplary suitable groups include $\alpha,\alpha'$-dihydroxy-o-xylene, $\alpha,\alpha'$-dihydroxy-m-xylene, $\alpha,\alpha'$-dihydroxy-p-xylene, $\alpha,\alpha'$-diacetoxy-o-xylene, $\alpha,\alpha'$-diacetoxy-m-xylene, $\alpha,\alpha'$-diacetoxy-p-xylene, $\alpha,\alpha'$-dipropionoxy-p-xylene, $\alpha,\alpha'$-di-n-butyloxy-p-xylene, $\alpha,\alpha'$-dimethoxy-o-xylene, $\alpha,\alpha'$-dimethoxy-m-xylene, $\alpha,\alpha'$-dimethoxy-p-xylene, $\alpha,\alpha'$-diethoxy-o-xylene, $\alpha,\alpha'$-diethoxy-m-xylene, $\alpha,\alpha'$-diethoxy-p-xylene, $\alpha,\alpha'$-diisopropoxy-o-xylene, $\alpha,\alpha'$-diisopropoxy-m-xylene, $\alpha,\alpha'$-diisopropoxy-p-xylene, $\alpha,\alpha'$-di-n-propoxy-p-xylene, $\alpha,\alpha'$-di-n-butoxy-m-xylene, $\alpha,\alpha'$-di-n-butoxy-p-xylene, $\alpha,\alpha'$-di-secbutoxy-p-xylene, $\alpha,\alpha'$-diisobutoxy-p-xylene, 4,4'-dihydroxymethyldiphenyl ether, 4,4'-dihydroxymethyldiphenyl, 2,6-dihydroxymethylnaphthalene, 4,4'-diacetoxymethyldiphenyl ether, 4,4'-diacetoxymethyldiphenyl, 2,6-diacetoxymethylnaphthalene, 4,4'-methoxydiphenyl ether, 4,4'-methoxymethyldiphenyl, 4,4'-diethoxymethylphenyl ether, 4,4'-diisopropoxymethyldiphenyl, 4,4'-diisobutoxymethyldiphenyl ether, $\alpha,\alpha'$-dimethoxy-2-methyl-p-xylene, $\alpha,\alpha'$-dimethoxy-3-methyl-m-xylene, $\alpha,\alpha'$-dihydroxy-2,5-dimethyl-p-xylene, $\alpha,\alpha'$-dimethoxy-2,5-dimethyl-p-xylene, $\alpha,\alpha'$-dimethoxy-2,4-dimethyl-1,3-xylene and $\alpha,\alpha'$-dimethoxy-2,4-dimethyl-1,5-xylene. Preferably, $R^2$ is $\alpha,\alpha'$-dimethoxy-p-xylene.

$R^1$ in the aromatic amine compound represented by the formula (V) is selected from the group consisting of a halogen atom, a hydroxyl group, an alkoxy group having no greater than 4 carbon atoms, and an alkyl group having no greater than 5 carbon atoms.

Preferably, $R^1$ is selected from the group consisting of an alkyl group having from 1 to 3 carbon atoms, a hydroxy group and a halogen atom. It is also preferred that $R^1$ does not exist in the general formula (V), i.e., that m is 0.

Preferably, only one amino group is present in the amine compound represented by the general formula (V). Exemplary suitable amino groups include aniline, o-toluidine, m-toluidine, p-toluidine, o-ethylaniline, m-ethylaniline, p-ethylaniline, o-isopropylaniline, m-isopropylaniline, p-isopropylaniline, o-n-propylaniline, o-tert-butylaniline, p-tert-butylaniline, o-n-butylaniline, p-sec-butylaniline, 2,3-xylidine, 2,4-xylidine, 2,6-xylidine, 3,4-xylidine, 3,5-xylidine, 2-methyl-3-ethylaniline, 2-methyl-4-isopropylaniline, 2,6-diethylaniline, 2-ethyl-5-tert-butylaniline, 2,4-diisopropylaniline, 2,4,6-trimethylaniline, 4-chloroaniline, 4-bromoaniline, 4-fluoroaniline, 3-chloroaniline, 3-bromoaniline, 3,4-dichloroaniline, 3-chloro-o-toluidine, 3-chloro-p-toluidine, 2,6-dimethyl-4-chloroaniline, o-aminophenol, m-aminophenol, p-aminophenol, 2-amino-4-cresol, 4-amino-2-tert-butylphenol, 2,6-dimethyl-4-aminophenol, 2,6-dichloro-4-aminophenol, 2-amino-1,3-resorcin, 4-amino-1,3-resorcin, 2-aminohydroquinone, 2-methoxyaniline, 3-methoxyaniline, 4-methoxyaniline, 2-isopropoxyaniline, 2,4-dimethoxyaniline, o-phenylenediamine, m-phenylenediamine, p-phenylenediamine, 2,4-diaminotoluene, 2,6-diaminotoluene, 2,4-diaminoethylbenzene, 2,6-diaminoethylbenzene, 2,4-diaminoisopropylbenzene, 2,4-diamino-tert-butylbenzene, 2,6-diamino-tert-butylbenzene, 2,4-diamino-1,3-dimethylbenzene, 1,1-dimethyl-4-aminoindane and 1,1-dimethyl-4,6-diaminoindane. Preferably, an amino group selected from the group consisting of aniline, toluidines, xylidines, aminophenols and diamines is employed.

With regard to the reaction of the aralkyl alcohol derivative of the formula (IV) and the aromatic amine compound of the formula (V), a condensation reaction is performed in a ratio of from about 1 to about 15 moles, preferably from about 1.1 to about 10 moles of the aromatic amine compound per mole of the aralkyl alcohol derivative at a temperature of from about 170° to about 240° C. for a period of from about 10 to about 40 hours in the presence of an acid catalyst such as hydrochloric acid. After completion of the reaction, the reaction mixture is neutralized with an alkali such as caustic soda, and is then washed with water. Afterwards, the unreacted aromatic amine compound is removed from the system under reduced pressure, thereby producing an aromatic amine resin of the formula (II).

The weight average molecular weight of the aromatic amine resin is from about 300 to about 60,000, and the softening point thereof is from about room temperature, at which the aromatic amine resin is liquid, to about 250° C. (determined by a ring and ball method in accordance with JIS-K-2548). Particularly preferred molecular weights and softening points of the aromatic amine resin are from about 300 to 20,000 and from about room temperature to about 200° C.

A preferred aromatic amine resin (II) is

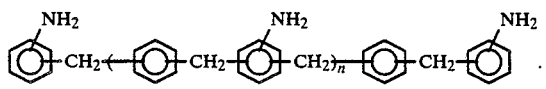

The thermosetting resin composition of the present invention can be prepared from the bismaleimide compound of the formula (I) and the aromatic amine resin of the formula (II) by any of the following procedures.

(I) The bismaleimide and the aromatic amine resin can be ground and mixed in a solid-solid state or in a solid-liquid state. Alternatively, these materials may be thermally treated to form a prepolymer, which is then ground into pellets or a powder. In this case, heating conditions are preferably such that curing proceeds partially up to the stage of the prepolymer. Usually heating treatment is carried out at a temperature of from about 70° C. to about 220° C. for from about 5 to about 240 minutes, preferably at from about 80° C. to about 200° C. for from about 10 to about 180 minutes.

(2) The bismaleimide and the aromatic amine resin are dissolved in an organic solvent, and the solution is then introduced into a poor solvent to deposit crystals, the latter are afterward collected by filtration and then dried to obtain pellets or a powder. Alternatively, after being dissolved in the organic solvent, the materials may be thermally treated to partially cure them to the stage of a prepolymer and are then introduced into the poor solvent. The deposited crystals are afterward collected by filtration and then dried to obtain pellets or a powder. The heating conditions in this case are the same as in the above-mentioned procedure (I).

The organic solvent must not react with either component, and in addition, it is preferred that the organic solvent be a good solvent to both components. Exemplary suitable reaction solvents include halogenated hydrocarbons such as methylene chloride, dichloroethane and trichloroethylene; ketones such as acetone, methyl ethyl ketone, cyclohexanone and diisopropyl ketone; ethers such as tetrahydrofuran, dioxane and methyl cellosolve; aromatic compounds such as benzene, toluene and chlorobenzene; and non-protonic polar solvents such as acetonitrile, N,N-dimethylformamide, N,N-dimethylacetamide, dimethyl sulfoxide, N-methyl-2-pyrrolidone and 1,3-dimethyl-2-imidazolidinone.

The aromatic amine resin of the formula (II) is present in the composition of the invention in an anount of from about 5 to about 100 parts by weight, preferably from about 5 to about 80 parts by weight, based on 100 parts by weight of the bismaleimide compound of the formula (I).

When the amount of the aromatic amine resin present in the composition is less than about 5 parts by weight, a cured article which is manufactured therefrom is extremely brittle and thus satisfactory bending strength cannot be obtained. Inversely, when the aromatic amine resin is present in an amount greater than about 100 parts by weight, the heat resistance of the cured article is low.

To the thermosetting resin composition of the present invention, the following components a, b and c may be added in amounts such that they do not to hinder achievement of the objects of the present invention.

(a) A curing accelerator: For example, a radical polymerization initiator such as an azo compound or an organic peroxide, or an ionic catalyst such as a tertiary amine, a quaternary ammonium salt, an imidazole or a boron trifluoride/amine salt.

(b) A powdery reinforcing material or filler: For example, a metallic oxide such as aluminum oxide or magnesium oxide, a metallic hydroxide such as aluminum hydroxide, a metallic carbonate such as magnesium carbonate, diatomaceous earth powder, basic magnesium silicate, calcined clay, fine silica powder, molten silica, crystaline silica, carbon black, kaolin, fine mica powder, quartz powder, metallic hydroxide such as aluminum hydroxide, graphite, asbestos, molybdenum disulfide or antimony trioxide. A fibrous reinforcing material or filler: For example, an inorganic fiber such as glass fiber, rock wool, ceramic fiber, alumina fiber or potassium titanate fiber, or an organic fiber such as carbon fiber or aromatic polyamide.

(c) Various synthetic resins which are used to improve characteristics of resins for final coating films, adhesive layers or resinous molded articles: For example, a thermosetting resin such as phenolic resin, epoxy resin or melamine resin or silicone resin, polyamide, polycarbonate, polysulfone, polyether sulfone, polyether ether ketone, modified polyphenylene oxide, polyphenylene sulfide, polyether imide and fluorine-containing resins.

The thermosetting resin composition of the present invention can be molded by known molding techniques such as compression molding, transfer molding, extrusion molding or injection molding. The composition of the invention is excellent in moldability.

In addition, the molded articles prepared from the thermosetting resin compositions of the present invention exhibit excellent mechanical strength and heat resistance. The composition of the invention have numerous applications in the electrical and electronic fields as well as mechanical fields, particularly aircrafts and vehicles and thus are of great industrial utility.

The invention will be further clarified by the following examples, which are intended to be purely exemplary of the invention.

SYNTHESIS EXAMPLE 1

In a reaction vessel equipped with a stirrer, a thermometer and a Dean Stark azeotropic distillation trap were placed 1,116 g (12.0 moles) of aniline as an aromatic amine compound represented by the general formula (V), 665 g (4.0 moles) of α,α'-dimethoxy-p-xylene as an aralkyl alcohol derivative represented by the general formula (IV) and 626 g (6.0 moles) of a 35% aqueous hydrochloric acid solution as a catalyst, and the temperature of the solution was raised while a nitrogen gas was fed thereinto. When the temperature in the reaction vessel, i.e., the inside temperature had reached a level of about 110° C., water began to distill and to collect in the trap, and the collected water was thrown away from the system. Afterwards, the temperature was further elevated, and when it reached a level of about 130° C., distillation of methanol was observed. While methanol was distilled off, the temperature was continuously raised, and after the inside temperature had reached 170° C., the temperature level was maintained constantly for 3 hours. When the period of time had elapsed, the generation of methanol was scarcely confirmed. Afterward, the inside temperature was continuously raised, and reaction was carried out at a temperature of 190° to 200° C. for 12 hours.

Next, the inside temperature was lowered to 95° C. by cooling, and 1,680 g of a 15% caustic soda solution were added thereto, followed by stirring and neutralizing. After standing, the resultant lower water layer was removed therefrom, and 3,000 g of a saturated saline solution were then added thereto, and washing and separation followed. Next, heating and dehydration were carried out under nitrogen flow, followed by pressing and filtering to remove inorganic salts and the like therefrom. The solution was then concentrated under a reduced pressure of from 2 to 3 mmHg to recover 519 g of unreacted aniline. The remaining solution was collected, and 945 g of a light yellowish brown aniline resin (aromatic amine resin) were obtained.

The aromatic amine resin was then analyzed by high-speed liquid chromatography. The compound of the general formula (II) in which $n=0$ was present in an amount of 28 mole %, the compound of $n=1$ in an amount of 16.8 mole %, the compound of $n=2$ in an amount of 10.5 mole %, the compound of $n=3$ in an amount of 7.8 mole %, and the compound of $n \geq 4$ in an amount of 36.9 mole %.

Furthermore, with regard to the thus obtained resin, its amine equivalent was 0.578 equivalent/100 g (perchloric acid-glacial acetic acid method), and its softening point was 68° C., when measured by a ring and ball method softening point measuring device in accordance with JIS-K-2548. In addition, the average molecular weight of the resin was 960.

SYNTHESIS EXAMPLE 2

Following the same procedure as in Synthesis Example 1 with the exception that 745 g (8.0 moles) of aniline, 664 g (4.0 moles) of α,α'-dimethoxy-p-xylene and 420 g (4.0 moles) of a 35% aqueous hydrochloric acid solution as a catalyst were used, a reaction was performed, thereby obtaining 747 g of a light yellowish brown aniline resin (aromatic amine resin).

The thus obtained aromatic amine resin was then analyzed by high-speed liquid chromatography. The compound of the general formula (II) in which $n=0$ was present in an amount of 17.0 mole %, the compound of $n=1$ in an amount of 14.5 mole %, the compound of $n=2$ in an amount of 13.2 mole %, and the compound of $n \geq 3$ in an amount of 55.2 mole %.

Furthermore, with regard to the obtained resin, its amine equivalent was 0.520 equivalent/100 g, its softening point of the resin was 61° C., and its average molecular weight was 2,100.

SYNTHESIS EXAMPLE 3

Following the same procedure as in Synthesis Example 1 with the exception that 244.4 g (2.0 moles) of 2,4-diaminotoluene as an aromatic amine compound represented by the general formula (V) and 209 g (2.0 moles) of a 35% aqueous hydrochloric acid solution as a catalyst were used, a reaction was performed, thereby obtaining 132 g of a reddish brown oily diamino toluene resin (aromatic amine resin).

The thus obtained aromatic amine resin was then analyzed by high-speed liquid chromatography. The compound of the general formula (II) in which $n=0$ was present in an amount of 44.5 mole %, the compound of $n=1$ in an amount of 29.7 mole %, the compound of $n=2$ in an amount of 14.6 mole %, and the compound of $n \geq 3$ in an amount of 11.2 mole %.

Furthermore, with regard to the obtained resin, its amine equivalent was 1.204, its softening point was 46° C., and its average molecular weight was 550.

SYNTHESIS EXAMPLE 4

Following the same procedure as in Synthesis Example 1 with the exception that 121.1 g (1.3 moles) of aniline as an aromatic amine compound represented by the general formula (V), 138.2 g (1.0 mole) of an α,α'-dihydroxy-m-xylene as an aralykyl alcohol derivative represented by the general formula (IV) and 33 g (0.325 mole) of concentrated sulfuric acid as a catalyst were used, reaction was performed, thereby obtaining 151 g of a light yellowish brown aniline resin (aromatic amine resin).

Furthermore, with regard to the obtained aromatic amine resin, its amine equivalent was 0.496, its softening point was 118° C., when measured by a ring and ball method softening point measuring device in accordance with JIS-K-2548, and its average molecular weight was 6,500.

SYNTHESIS EXAMPLE 5

In a reaction vessel were placed 109 g (1.0 mole) of p-aminophenol as an aromatic amine compound represented by the general formula (V), 110.2 g (0.5 mole) of α,α'-diacetoxy-p-xylene as an aralkyl alcohol derivative represented by the general formula (IV), and 6.8 g (0.05 mole) of zinc chloride and 19 g (0.1 mole) of p-toluenesulfonic acid as catalysts, and a reaction was carried out under reduced pressure given by a water jet pump. The reaction began at about 30° C., and the temperature was raised up to 170° C. in 3 hours. In the meantime, the formed acetic acid was recovered through a deep cooling trap. The temperature level was maintained for 3 hours, and then the reaction temperature was raised up to 200° C. Aging was then carried out at a temperature of from 200° to 210° C. for 1 hour, and at this point of time, the reaction was brought to an end. The solution was then cooled to 95° C., and 300 ml of toluene were added thereto, followed by stirring and dissolving. Afterward, 20.2 g of triethylamine were added thereto, and 200 ml of water were further added thereto. The solution was then stirred and allowed to stand, and the resultant lower water layer was removed therefrom. The solution was further washed with 200 ml of water one more time, and the water layer was then removed therefrom. Afterward, the solution was concentrated under reduced pressure so as to remove toluene and unreacted p-aminophenol therefrom, so that a brown residue which was a co-condensation resin (aromatic amine resin) of p-aminophenol was obtained in an amount of 138 g.

With regard to the thus obtained aromatic amine resin, its amine equivalent was 0.525, its softening point was 94° C., when measured by a ring and ball method softening point measuring device in accordance with JIS-K-2548, and its average molecular weight was 2,200.

SYNTHESIS EXAMPLES 6 TO 14

Reactions were performed in accordance with the same procedure as in Synthesis Example 1 with the exception that the kind of aromatic amine compound represented by the general formula (V), the kind and amount of aralkyl alcohol derivative represented by the general formula (IV), the kind and amount of catalysts and reaction conditions were as shown in Table 1, thereby obtaining various aromatic amine resins shown in Table 1.

EXAMPLE 1 TO 4

In a stainless reaction vessel equipped with a stirrer, a reflux condenser and a nitrogen introduction pipe were placed 4,4'-bis(3-maleimidophenoxy)biphenyl and the aromatic amine resin obtained in Synthesis Example 1 in amounts shown in Table 2. The compositions were heated and melted at 180° C. for 20 minutes. Afterward, defoaming was carried out at 150° C. under reduced pressure (10 to 15 mmHg) for 30 minutes, and the material was then cooled to room temperature, thereby obtaining a brown semitransparent resin composition which was solidified in a glass state.

A mold which had been heated to 180° C. was then packed with the thus obtained composition, while the latter was heated and melted, and it was then maintained at 200° C. under 50 kg/cm$^2$ for 30 minutes to perform compression molding. Afterward, the molded piece was taken out therefrom. The piece was further postcured at 250° C. for 4 hours in an oven, so that a 127-mm-long, 12.7-mm-wide, 6.4-mm-thick cured specimen was prepared.

For the respective specimens prepared by the above-mentioned procedure, thermal deformation temperature and bending strength were measured in accordance with ASTM-D-648 and ASTM-D-790, and a thermal decomposition starting temperature was also measured in the air at a temperature rise rate of 10° C./minute. The results are set forth in Table 2.

EXAMPLES 5 TO 20 AND COMPARATIVE EXAMPLES 1 AND 2

The same procedure as in Examples 1 to 4 was repeated with the exception that 100 parts by weight of each bismaleimide compound shown in Table 2 were used and each aromatic amine resin shown in Table 2 was used in an amount shown in Table 2. The results are set forth in Table 2.

COMPARATIVE EXAMPLE 3

The same procedure as in Examples 1 to 4 was repeated with the exception that N,N'-4,4'-diphenylmethanebismaleimide and 4,4'-diaminodiphenylmethane were used in amounts shown in Table 2. The results are set forth in Table 2.

COMPARATIVE EXAMPLE 4

A molded specimen was prepared in accordance with the same procedure as in Examples 1 to 4 with the exception that a polyaminobismaleimide resin (trade name Kelimid-1050; made by Nippon Polyimid Co., Ltd.) was substituted for the resin composition of the present invention, and various physical properties were measured. The results are set forth in Table 2.

According to the results in Table 2, molded articles obtained from the thermosetting resin composition of the present invention had high bending strength and bending elasticity modulus, and had a thermal deformation temperature of 290° C. or more and a thermal decomposition starting temperature of 350° C. or more, which was indicative that the articles obtained from the composition of the present invention were also excellent in heat resistance.

TABLE 1

(Synthesis Examples of Various Aromatic Amine Resins)

| | Aromatic Amine | | Aralkyl Alcohol Derivative | | Catalyst | | Reaction Conditions | Repeating Unit | Yield (g) | Molecular Weight | Softening Point (°C.)* |
|---|---|---|---|---|---|---|---|---|---|---|---|
| | Kind | Amount (mole) | Kind | Amount (mole) | Kind | Amount (mole) | temp./time (°C.) (hr) | | | | |
| Synthesis Example 6 | o-Toluidine | 1.2 | 4,4'-Dihydroxymethyldiphenyl ether | 0.12 | HCl | 0.4 | 140-170/5 170-195/12 | [structure with $NH_2$, $CH_3$, $CH_2$, phenyl-O-phenyl-$CH_2$]$_n$ | 50.5 | 580 | Oily |
| Synthesis Example 7 | 2,4-Xylydine | 1.2 | α,α'-Diisopropoxy-p-xylene | 0.4 | " | 0.6 | 130-170/5 170-200/8 | [structure with $NH_2$, $CH_3$, $CH_3$, $CH_2$-phenyl-$CH_2$]$_n$ | 116 | 1350 | 75 |
| Synthesis Example 8 | 2,4,6-Trimethylaniline | 1.2 | α,α'-Dihydroxy-2,5-dimethyl-p-xylene | 0.3 | " | 0.24 | 130-170/5 200-210/8 | [structure with $NH_2$, $CH_3$, $CH_3$, $CH_3$, $CH_2$-xylyl($CH_3$,$CH_3$)-$CH_2$]$_n$ | 92 | 850 | 70 |
| Synthesis Example 9 | p-n-Propylaniline | 1.2 | α,α'-Dimethoxy-p-xylene | 1.0 | " | 0.6 | 130-150/5 180-200/14 | [structure with $NH_2$, $nC_3H_7$, $CH_2$-phenyl-$CH_2$]$_n$ | 246 | 12000 | 142 |

TABLE 1-continued (Synthesis Examples of Various Aromatic Amine Resins)

| | Aromatic Amine | | Aralkyl Alcohol Derivative | | Catalyst | | Reaction Conditions temp./time (°C.) (hr) | Repeating Unit | Yield (g) | Molecular Weight | Softening Point (°C.) |
|---|---|---|---|---|---|---|---|---|---|---|---|
| | Kind | Amount (mole) | Kind | Amount (mole) | Kind | Amount (mole) | | | | | |
| Synthesis Example 10 | m-Isopropoxyaniline | 1.2 | α,α'-Dimethoxy-p-xylene | 0.4 | " | 0.24 | 130-150/3 170-190/6 | 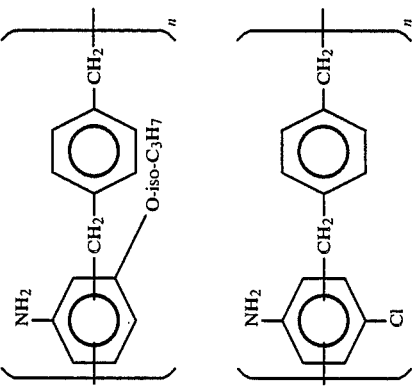 | 120 | 1200 | 56 |
| Synthesis Example 11 | p-Chloroaniline | 1.2 | α,α'-Dimethoxy-p-xylene | 0.4 | $H_3PO_4$ | 0.24 | 150-170/5 190-200/8 | 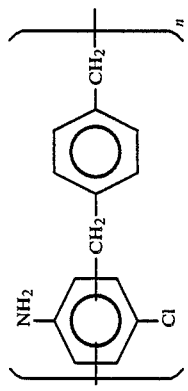 | 118 | 1150 | 78 |
| Synthesis Example 12 | 4-Chloro-o-toluidine | 1.2 | α,α'-Dimethoxy-p-xylene | 0.4 | HCl | 0.6 | 150-170/5 190-200/12 | 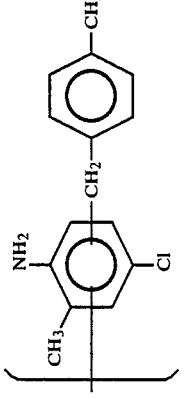 | 120 | 1100 | 75 |
| Synthesis Example 13 | 3,5-Dichloro-4-aminophenol | 1.2 | α,α'-Dimethoxy-p-xylene | 0.4 | " | 0.6 | 150-170/5 170-190/12 | 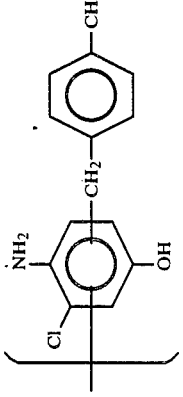 | 135 | 1250 | 75 |

TABLE 1-continued
(Synthesis Examples of Various Aromatic Amine Resins)

| | Aromatic Amine | | Aralkyl Alcohol Derivative | | Catalyst | | Reaction Conditions temp./time (°C.) (hr) | Repeating Unit | Yield (g) | Molecular Weight | Softening* Point (°C.) |
|---|---|---|---|---|---|---|---|---|---|---|---|
| | Kind | Amount (mole) | Kind | Amount (mole) | Kind | Amount (mole) | | | | | |
| Synthesis Example 14 | 5-tert-Butyl-o-toluidine | 1.2 | α,α'-Dimethoxy-p-xylene | 0.4 | Trifluoromethane-sulfonic acid | 0.15 | 130–150/3 170–190/6 | $\left[\begin{array}{c}\text{structure with NH}_2,\text{ CH}_3,\text{ CH}_2,\text{ tert-C}_4\text{H}_9,\text{ CH}_2\end{array}\right]_n$ | 142 | 1520 | 87 |

*The softening point was measured by a ring and ball method softening point measuring device in accordance with JIS-K-2548.

TABLE 2

(Examples 1 to 20 and Comparative Examples 1 to 4)

| | Bismale-imide (pts. wt.) | Aromatic amine Resin (pts. wt.) | Bending Strength (kg/mm²) | Bending Elasticity Modulus (kg/mm²) | Thermal Deformation temp. (°C.) | Thermal Decomposition starting temp. (°C.) |
|---|---|---|---|---|---|---|
| Example 1 | 4,4'-Bis(3-maleimido-phenoxy)biphenyl (100) | Syn. Ex. 1 (10) | 13.0 | 352 | >300 | 382 |
| Example 2 | 4,4'-Bis(3-maleimido-phenoxy)biphenyl (100) | Syn. Ex. 1 (30) | 14.1 | 364 | >300 | 373 |
| Example 3 | 4,4'-Bis(3-maleimido-phenoxy)biphenyl (100) | Syn. Ex. 1 (50) | 14.6 | 376 | >300 | 369 |
| Example 4 | 4,4'-Bis(3-maleimido-phenoxy)biphenyl (100) | Syn. Ex. 1 (80) | 13.7 | 372 | 297 | 365 |
| Example 5 | 4,4'-Bis(3-maleimido-phenoxy)biphenyl (100) | Syn. Ex. 2 (50) | 13.8 | 375 | >300 | 370 |
| Example 6 | 4,4'-Bis(3-maleimido-phenoxy)biphenyl (100) | Syn. Ex. 3 (50) | 14.2 | 363 | 292 | 359 |
| Example 7 | 4,4'-Bis(3-maleimido-phenoxy)biphenyl (100) | Syn. Ex. 4 (50) | 14.1 | 375 | >300 | 363 |
| Example 8 | 4,4'-Bis(3-maleimido-phenoxy)biphenyl (100) | Syn. Ex. 5 (50) | 14.5 | 375 | >300 | 363 |
| Example 9 | 4,4'-Bis(3-maleimido-phenoxy)biphenyl (100) | Syn. Ex. 6 (30) | 13.5 | 365 | 292 | 355 |
| Example 10 | 4,4'-Bis(3-maleimido-phenoxy)biphenyl (100) | Syn. Ex. 7 (50) | 13.7 | 376 | >300 | 358 |
| Example 11 | 4,4'-Bis(3-maleimido-phenoxy)biphenyl (100) | Syn. Ex. 8 (50) | 13.7 | 362 | 296 | 352 |
| Example 12 | 4,4'-Bis(3-maleimido-phenoxy)biphenyl (100) | Syn. Ex. 9 (50) | 14.5 | 378 | >300 | 372 |
| Example 13 | 4,4'-Bis(3-maleimido-phenoxy)biphenyl (100) | Syn. Ex. 10 (50) | 13.9 | 368 | >300 | 360 |
| Example 14 | 4,4'-Bis(3-maleimido-phenoxy)biphenyl (100) | Syn. Ex. 11 (50) | 14.2 | 375 | >300 | 362 |
| Example 15 | 4,4'-Bis(3-maleimido-phenoxy)biphenyl (100) | Syn. Ex. 12 (50) | 14.3 | 375 | >300 | 361 |

TABLE 2-continued
(Examples 1 to 20 and Comparative Examples 1 to 4)

| | Bismaleimide (pts. wt.) | Aromatic amine Resin (pts. wt.) | Bending Strength (kg/mm²) | Bending Elasticity Modulus (kg/mm²) | Thermal Deformation temp. (°C.) | Thermal Decomposition starting temp. (°C.) |
|---|---|---|---|---|---|---|
| Example 16 | 4,4'-Bis(3-maleimidophenoxy)biphenyl (100) | Syn. Ex. 13 (50) | 14.6 | 371 | >300 | 364 |
| Example 17 | 4,4'-Bis(3-maleimidophenoxy)biphenyl (100) | Syn. Ex. 14 (50) | 14.1 | 375 | >300 | 359 |
| Example 18 | 1,3-Bis(3-maleimidophenoxy)benzene (100) | Syn. Ex. 1 (50) | 13.6 | 369 | >300 | 357 |
| Example 19 | 2,2-Bis[4-(3-maleimidophenoxy)phenyl]propane (100) | Syn. Ex. 1 (50) | 14.1 | 365 | >300 | 362 |
| Example 20 | 2,2-Bis[4-(3-maleimidophenoxy)phenyl] sulfide (100) | Syn. Ex. 1 (50) | 14.2 | 370 | >300 | 361 |
| Comp. Ex. 1 | 4,4'-Bis(3-maleimidophenoxy)biphenyl (100) | — | Molding was impossible (cracks occurred) | | | 420 |
| Comp. Ex. 2 | 4,4'-Bis(3-maleimidophenoxy)biphenyl (100) | Syn. Ex. 1 (150) | 9.1 | 351 | 279 | 342 |
| Comp. Ex. 3 | N,N'-4,4'-Diphenylmethane-bismaleimide (100) | 4,4'-Diaminodiphenylmethane (30) | 8.6 | 352 | 276 | 330 |
| Comp. Ex. 4 | Kelimid | | 8.6 | 352 | 285 | 333 |

What is claimed is:

1. A thermosetting resin composition comprising (i) about 100 parts by weight of a bismaleimide compound represented by the formula (I)

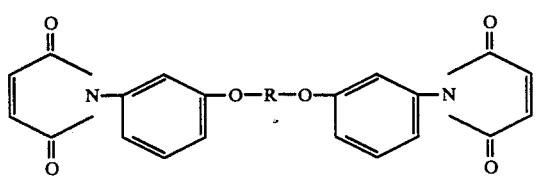

wherein R represents a divalent group selected from the group consisting of

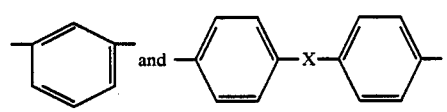

wherein X is directly bonded to the benzene rings and is a group selected from the group consisting of a divalent hydrocarbon group having from 1 to 10 carbon atoms, an isopropylidene group having six fluorine atoms, a carbonyl group, a thio group, a sulfinyl group, a sulfonyl group and an oxo group, and (ii) from about 5 to about 100 parts by weight of an aromatic amine resin represented by the formula (II)

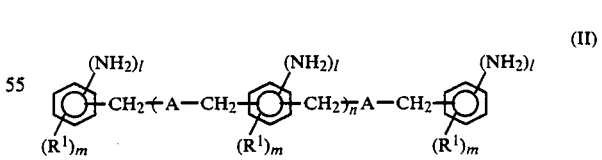

wherein A represents a group selected from the group consisting of a phenylene group, an alkyl-substituted phenylene group, a diphenylene group, a diphenyl ether group and a naphthylenyl group; $R^1$ is selected from the group consisting of a halogen atom, a hydroxyl group, an alkoxy group having no greater than 4 carbon atoms, and an alkyl group having no greater than 5 carbon atoms; $l$ is 1 to 2; $m$ is an integer of from 0 to 3, and $n$ is an integer of from 0 to 300.

2. The thermosetting resin composition of claim 1 wherein m is 2 or 3 and the groups represented by R¹ are indentical.

3. The thermosetting resin composition of claim 1 wherein m is 2 or 3 and the groups represented by R¹ are different.

4. The thermosetting resin composition of claim 1 wherein m is 2 or 3 and the groups represented by R¹ form a five membered ring or six membered aliphatic ring which may have a side chain.

5. The thermosetting resin composition of claim 1 wherein said R in said formula (I) represents a divalent group selected from the group consisting of

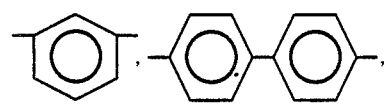

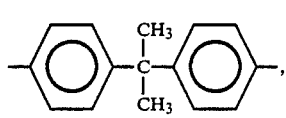

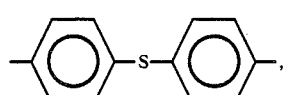

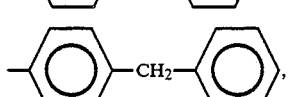

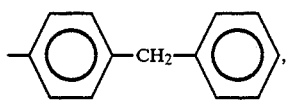

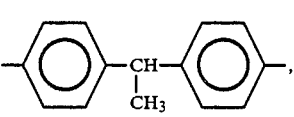

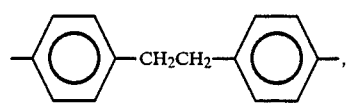

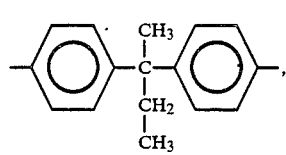

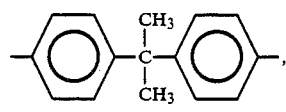

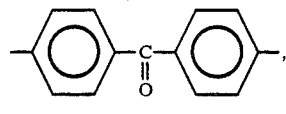

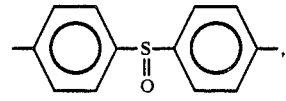

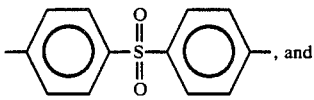, and

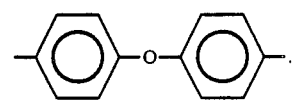.

6. The thermosetting resin composition of claim 1 wherein R in said formula (I) represents a divalent group selected from the group consisting of

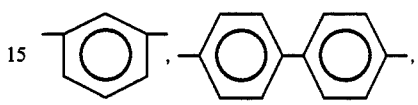

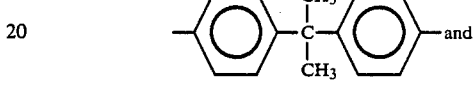 and

.

7. The thermosetting resin composition of claim 1 wherein A in said formula (II) represents a group selected from the group consisting of

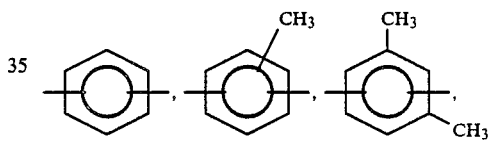

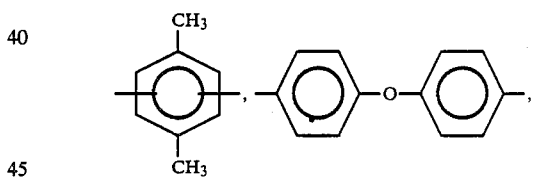

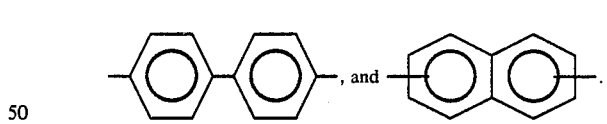

8. The thermosetting resin composition of claim 1 wherein A in said formula (II) represents a group selected from the group consisting of and

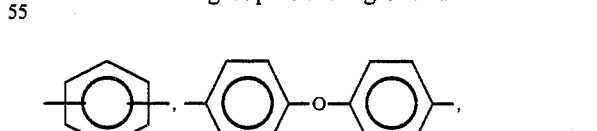

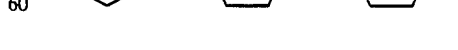

9. The thermosetting resin composition of claim 1 wherein A in said formula (II) represents 15. The thermosetting resin composition of claim 13 wherein the bismaleimide compound of the formula (I) is

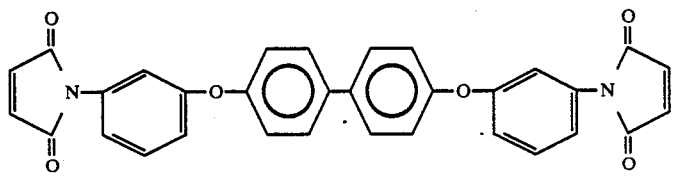

16. The thermosetting resin composition of claim 13 wherein the bismaleimide compound of the formula (I) is

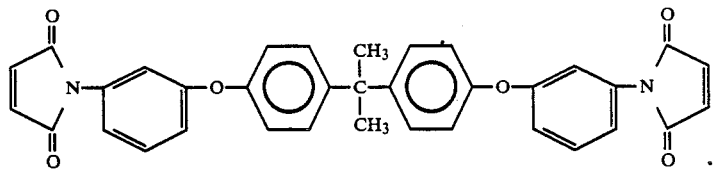

10. The thermosetting resin composition of claim 1 wherein $R^1$ in said formulat (II) is selected from the group consisting of an alkyl group having from 1 to 3 carbon atoms, a hydroxyl group and a halogen atom.

11. The thermosetting resin composition of claim 1 wherein m in said formula (II) is 0.

12. The thermosetting resin composition of claim 1 wherein said l in said formula (II) is 1.

13. The thermosetting resin composition of claim 1 wherein the aromatic amine resin of the formula (II) is

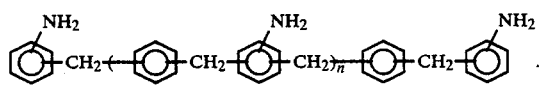

14. The thermosetting resin composition of claim 13 wherein the bismaleimide compound of the formula (I) is

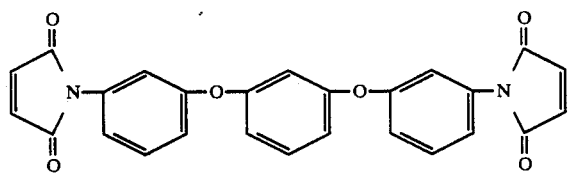

17. The thermosetting resin composition of claim 13 wherein the bismaleimide compound of the formula (I) is

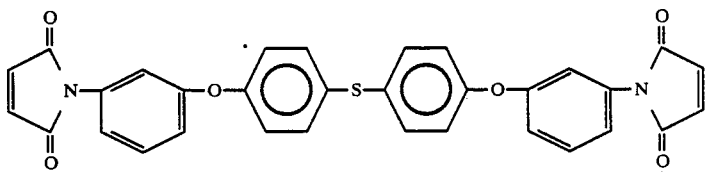

18. The thermosetting resin composition of claim 1 wherein the weight average molecular weight of said aromatic amine resin is from about 300 to about 60,000.

19. The thermosetting resin composition of claim 1 wherein the molecular weight of said aromatic amine resin is from about 300 to about 20,000.

20. A process for preparing the thermosetting resin composition of claim 1 comprising mixing about 100 parts of said bismaleimide compound of the formula (I) with from about 5 to about 80 parts by weight of said aromatic amine resin of the formula (II).

21. The process of claim 20 further comprising heating a mixture of said bismaleimide compound of the formula (I) and said aromatic amine resin of the formula (II) at a temperature of from about 70 to about 220° C. for from about 10 to about 180 minutes to partially cure said mixture to form a prepolymer.

* * * * *

UNITED STATES PATENT AND TRADEMARK OFFICE
CERTIFICATE OF CORRECTION

PATENT NO. : 4,959,443

DATED : September 25, 1990

INVENTOR(S) : Norimasa Yamaya et al.

It is certified that error appears in the above-identified patent and that said Letters Patent is hereby corrected as shown below:

In claim 1, column 22, line 67, amend "to" (first occurrence) to -- or --.
Column 23:
In claim 5, formula 4, amend from " 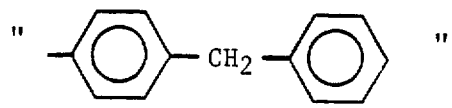 "

to

-- 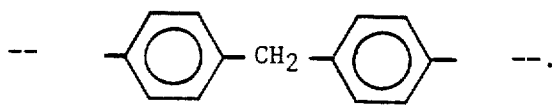 --.

Column 24:
In claim 8, line 54, delete "and".

In claim 8, formula 2, amend from

" 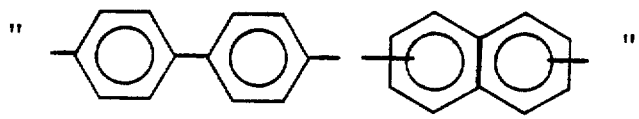 "

to

-- 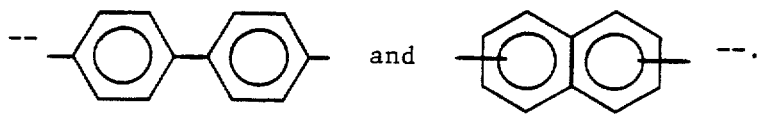 --.

Column 25:
In claim 10, line 26, amend "formulat" to -- formula --.

UNITED STATES PATENT AND TRADEMARK OFFICE
CERTIFICATE OF CORRECTION

PATENT NO.  :  4,959,443

DATED       :  September 25, 1990

INVENTOR(S) :  Norimasa Yamaya et al.

It is certified that error appears in the above-identified patent and that said Letters Patent is hereby corrected as shown below:

Column 26
In Claim 19, line 41, between "the" and "molecular" insert
-- weight average --.

Signed and Sealed this

Ninth Day of June, 1992

Attest:

DOUGLAS B. COMER

*Attesting Officer*    Acting Commissioner of Patents and Trademarks